United States Patent
Chang et al.

[11] Patent Number: 5,832,074
[45] Date of Patent: Nov. 3, 1998

[54] INTELLIGENT TELEPHONE SYSTEM

[75] Inventors: Jackson Chang; David Lin; James Cao, all of Taipei, Taiwan

[73] Assignee: Inventec Corporation, Taipei, Taiwan

[21] Appl. No.: 758,506

[22] Filed: Dec. 2, 1996

[51] Int. Cl.$^6$ ............... H04M 1/00; G05B 9/02; H04B 3/36

[52] U.S. Cl. ............ 379/355; 379/356; 379/368; 364/189; 364/709.01; 340/407.2

[58] Field of Search ................... 379/356, 353, 379/355, 360, 368, 67; 364/189, 709.01; 380/52; 235/61; 340/407.2; 341/20; 345/168

[56] References Cited

U.S. PATENT DOCUMENTS

| | | | |
|---|---|---|---|
| 4,503,288 | 3/1985 | Kessler | 379/67 |
| 4,860,339 | 8/1989 | D'Agosto, III et al. | 379/67 |
| 4,928,306 | 5/1990 | Biswas et al. | 379/201 |
| 5,195,130 | 3/1993 | Weiss et al. | 379/93.19 |
| 5,425,095 | 6/1995 | Yoshino | 359/355 |
| 5,668,544 | 9/1997 | Chang et al. | 341/26 |
| 5,703,795 | 12/1997 | Mankovitz | 364/514 |

*Primary Examiner*—Daniel S. Hunter
*Assistant Examiner*—Charles N. Appiah
*Attorney, Agent, or Firm*—McDermott, Will & Emery

[57] ABSTRACT

The present invention relates to an intelligent telephone system, operating methods related to the system are also disclosed. The intelligent telephone is capable of programming operating procedures as a shortcut for re-operating in the future. Furthermore, achieve the purpose of conveniently operating some complicated operating processes for a user, and being capable of automatically performing in a preset time limit. The intelligent telephone system includes storage means, a ROM (Read Only Memory), an LCD (Liquid Crystal Display), a telephone interface, a CPU (Central Processing Unit), and a user inputting interface. The user interface is used for receiving audio information and commands for controlling operations to shortcuts. In software structure, the intelligent system includes a system control module, a shortcut functional module, and lots of software modules. The system control module gives control rights and relative messages to the shortcut functional module. The shortcut functional module then control actions of the software modules for the purpose of completely handling shortcut operations.

7 Claims, 4 Drawing Sheets

5,832,074

INTELLIGENT TELEPHONE SYSTEM

BACKGROUND OF THE INVENTION

1. Field of the Invention

The present invention relates a telephone system, and more particularly to an intelligent telephone system for programming processes of dialing operations, and re-operating those operations, furthermore, to achieve the purpose of conveniently operating some complicated operating processes for a user, and being capable of automatically performing in a preset time limit.

2. Description of the Prior Art

As public usage of telephone systems everywhere, some functions can be implemented based on the systems. In this reason, operations to the telephone systems become more and more complicated. It always needs more than 10 numbers while a user dials an international long-distance telephone call in a conventional telephone system. In addition, some services of the telephone systems such as telephone shopping and family bank, also need more operating steps than ever. It also implies while the user wants to operate those services, he/she needs to input a lot of complex commands to control the telephone systems.

System control module sends commands to relative software modules for further processing in a traditional telephone system, but lack of storage to those processing operations. Therefore, the user must reenter those commands if they need to be performed once again. Not only waste time of the user, but usually causes inputting error while complicated procedures are needed.

SUMMARY OF THE INVENTION

The principal object of the present invention is to provide a telephone system to be capable of programming operating steps as a shortcut while a user wants to store the shortcut for future replaying.

The other object of the present invention is to provide the telephone system to be capable of presetting a time limit for replaying a shortcut in advance.

The intelligent telephone system according to the present invention is composed of storage means, a ROM (Read Only Memory), an LCD (Liquid Crystal Display), a telephone interface, a CPU (Central Processing Unit), and a user interface. The user interface includes a handset and a lot of keyboards for receiving'speech information and commands for operating shortcuts.

Software structure of the intelligent telephone system according to the present invention is a system control module, a shortcut functional module, and lots of software modules. The system control module gives control rights and relative messages to the shortcut functional module instead of giving directly to the software modules for the purpose of completely handling operations to shortcuts. The shortcut functional module then calls the relative software modules to process operations such as editing, setting, and programming, etc..

BRIEF DESCRIPTION OF THE DRAWINGS

Preferred embodiments of the invention will now be described in connection with the accompanied drawings, in which.

DESCRIPTION OF THE PREFERRED EMBODIMENT

Preferred embodiments of the present invention will be described hereinafter.

Figure 1:
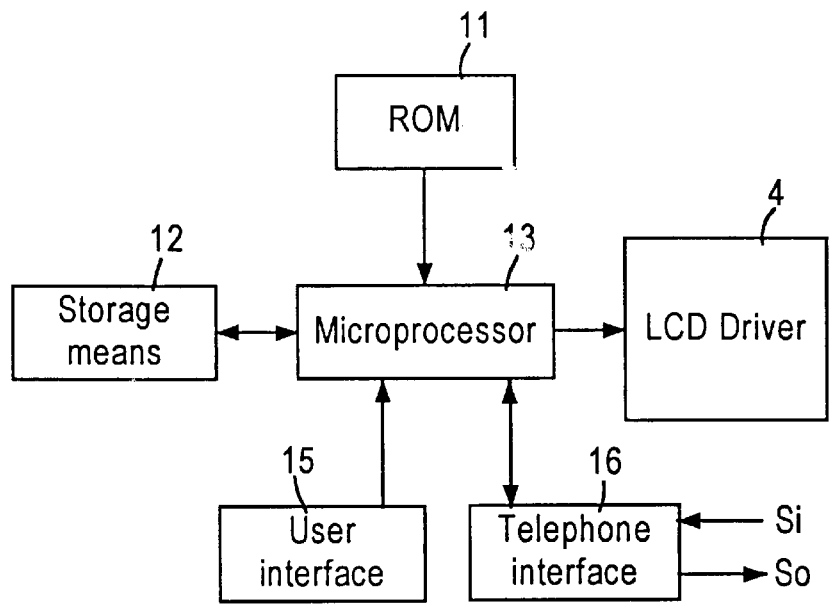
FIG. 1 describes internal structure diagram of an intelligent telephone system according to the present invention.

FIG. 1 is an internal block diagram of the intelligent telephone system (referring to "phone system" as for short) according to the present invention. The block diagram includes a ROM (Read Only Memory) 11, storage means 12, a CPU (Central Processing Unit) 13, an LCD (Liquid Crystal Display) driver 14, a user inputting unit 15, and a telephone interface 16. The ROM 11 is used to store control program, the storage means 12 store shortcut and system information, and a RAM (Random Access Memory) or a flash memory is used to construct the storage means 12. The CPU controls all actions of the phone system. The LCD driver 14 generates video information to a user, the user inputting unit 15 receives commands from a user. Finally, the telephone interface 16 sends out internal telephone signals $S_o$ through a pair of telephone lines, and receives external telephone signals $S_i$ from the telephone lines.

Figure 2:
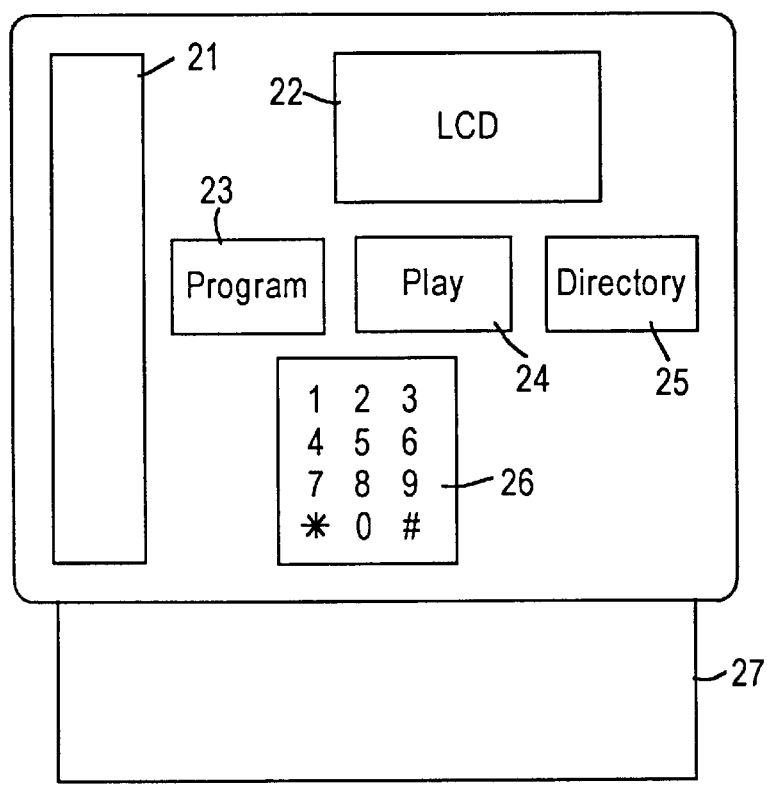
FIG. 2 represents an overview of the intelligent telephone system according to the present invention.

An overview of the phone system is illustrated in FIG. 2. There are some basic elements as follow: a handset 21, an LCD 22, a program key 23, a play key 24, a directory key 25, a numerical alphabet keyboard 26, and an English alphabet keyboard 27. The handset 21 is utilized by a user to talk with another remote user, the program key 23, the play key 24, the directory key 25, the numerical alphabet keyboard 26, and the English alphabet keyboard 27 are also utilized to receive commands from the user. Furthermore, relative information is displayed on the LCD 22.

Figure 6:
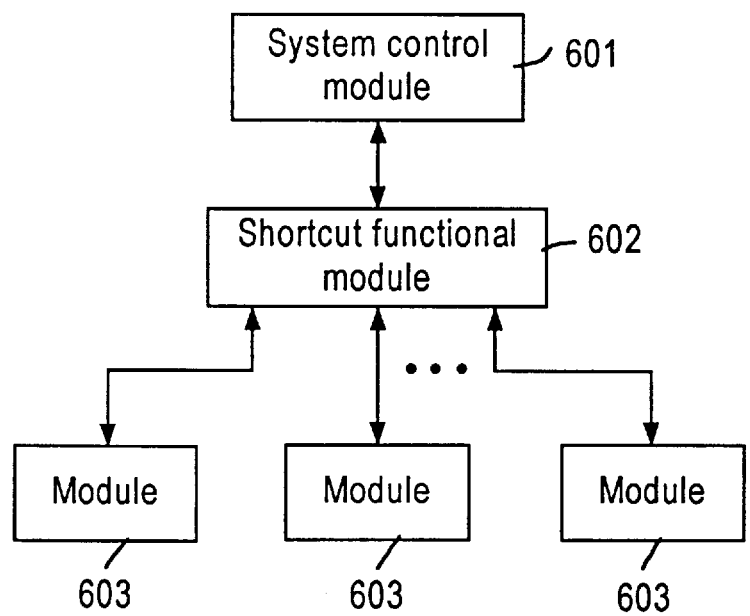
FIG. 6 is the software structure of the intelligent telephone system.

FIG. 6 describes the software structure of the phone system. In contrast to conventional telephone system, the intelligent telephone system increases a shortcut functional module 602 between the system control module 601 and those essential software modules 603.

When the system control module 601 needs supports from a software module 603, it does not give control rights and relative messages to the specific software module 603, but give them to the shortcut functional module 602. Therefore, all operating actions, such as programming, storing, and editing a shortcut, can be implemented based on the shortcut functional module calls relative software modules 603.

Figure 3:
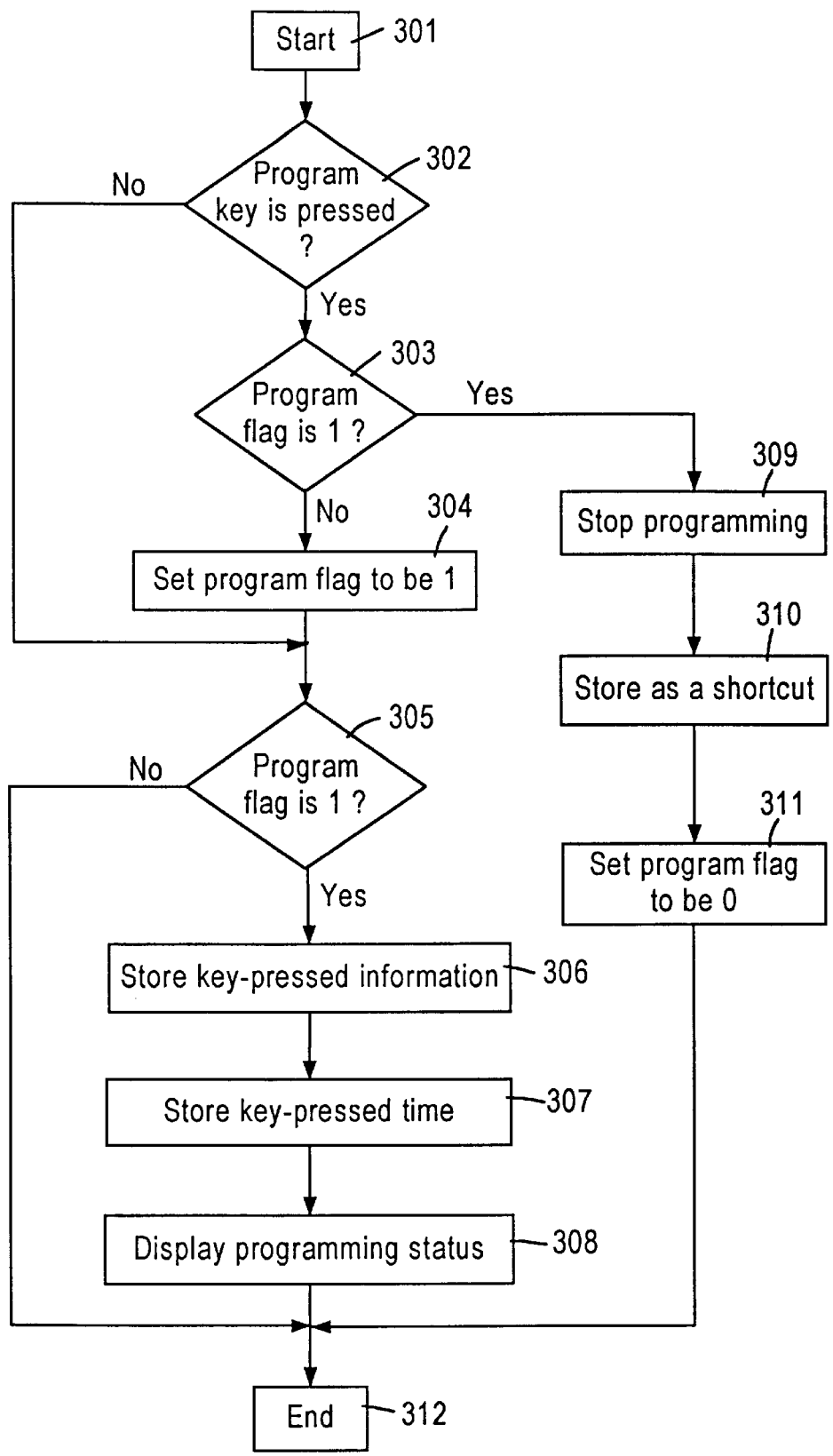
FIG. 3 is a flow chart summarizing programming operations of the intelligent telephone system.

A flow chart summarizing operations of programming a shortcut is represented in FIG. 3. Each time when the program key 23 is pressed (step 301, 302), the phone system will check a Boolean type of programming flag, at first (step 303). If the programming flag is false, it implies that a programming operation is permissible (that is, there is no other programming operation is executing). Next, this programming flag is set to be true to start a programming operation (step 304).

The phone system will perform a series of operations after the program key 23 is pressed. At first, the phone system will detect whether the programming flag is true or not (step 305), for the purpose of deciding whether a programming action is still executing or not. If it does, the phone system saves key-pressed information (step 306), key-pressed time (step 307) that the key is pressed by a user currently. Current programming status is also displayed on the LCD 22 to notify the user (step 308). Waiting for another key-pressed action after all storing operations complete (step 312).

Because the following key pressed by the user is not the program key 23 when the user wants to store a shortcut (otherwise all programming actions will stop) (step 302), the phone system will check status of the programming flag once again. Owing to content of the programming flag is true this time, all key-pressed information, key-pressed time are saved by the phone system (step 306, 307). In the following, relative information is also displayed on the LCD 22 (step 308). The procedures mentioned above are repeating until the user finishes all operating steps.

As all operating steps finishes, the user must press the program key once again (step 302), the phone system then detects the state of the programming flag again (step 303). Because the content of the programming flag is true this time, it implies that a programming operation is acting, and all programming actions are finished. The phone system stops this programming operation (step 309), saves all the operating steps as a macro type, and named the macro as a shortcut. A name of the shortcut is required for achieving purpose of fast replaying it next time. Finally, the programming flag is reset to be false (step 311), it also completes the programming operation.

Figure 5:
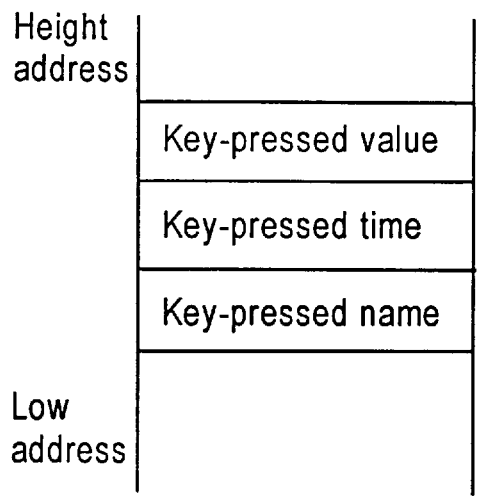
FIG. 5 simply describes a storage situation of each key information.

Relative information of each pressed key stored by the phone system is simply described in FIG. 5. Each key pressed by the user occupied 21 bytes of memory, where key-pressed value contains 1 bytes, key-pressed time contains 2 bytes of memory, and key-pressed name occupies the remainder 18 bytes. Basic unit of the key-pressed time is 100 millisecond, therefore, 655 seconds is the longest time represented by it. The key-pressed name is used for notifying operating steps to the user.

Figure 4:
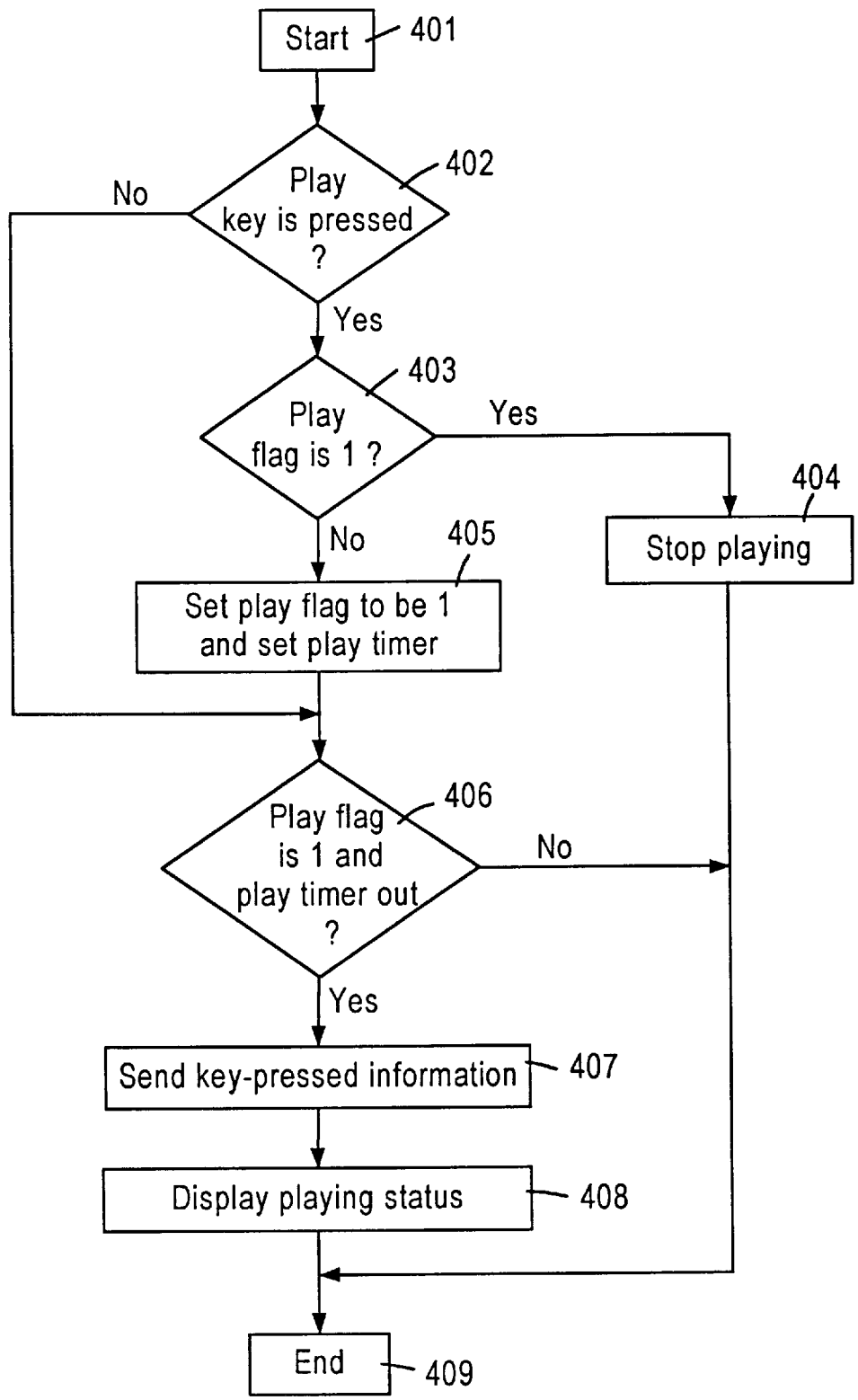
FIG. 4 illustrates a flow chart describing replaying operations to a shortcut in the intelligent telephone system.

FIG. 4 describes operations of playing a shortcut in the phone system. When the play key 24 is pressed (step 401, 402), the phone system checks status of a Boolean type play flag (step 403), at first. If the state of the play flag is false, it implies that a play operation is permissible (that is, no other play operation is executing). Next, the phone system will set the play flag to be true, then display a shortcut menu on the LCD 22 to notify the user to select a shortcut for executing. A timer is setting as following for reprocessing a playing operation which is going to start (step 404).

The purpose of setting a timer is to repeat all operating steps stored in a shortcut. Because all key-pressed times are stored while storing the shortcut, operating steps of the shortcut will be completely simulated by following the key-pressed time and then sending out key-pressed information. Therefore, when a key-pressed information is sent out, the next key-pressed information will not be sent until content of the timer is equal to the next key-pressed time, and the shortcut can be executed once again exactly.

After the play key 24 is pressed and a shortcut is selected, the phone system will execute the shortcut automatically. At first, the phone system sends first key-pressed information of the shortcut (step 407) when it detects the state of the play flag is true and the content of the timer equals to the first key-pressed time (step 406). Relative playing status is displayed on the LCD 22 (step 408). Similarly, next fey-pressed information is being sent while the content of the timer is equal to the next key-pressed time. The procedures mentioned above are repeating until all key-pressed information is executed (step 409).

When a shortcut is played and the play key 24 is pressed by the user once again, the executing shortcut will be stopped (step 404). The phone system will display the shortcut menu on the LCD 22 again, to notify the user to choose a shortcut for performing.

In addition, the phone system according to the present invention also provide functions of auto play and edit a shortcut.

Function of auto play a shortcut can be implemented by using the directory key 25. A user can select items of the displayed menu for executing once or executing daily. If the user chooses for executing once, the phone system will provide the user to preset a time limit in advance, and then execute the selected shortcut at the time preset. If the user selects for executing every day, the phone system also provides the user to preset a time limit in advance, and then execute the selected shortcut at the preset time each day.

Function of editing a shortcut also can be implemented by using the directory key 25. Owing to the relative information of a shortcut such as inputting telephone number, alphabets, the user can choose item of the display menu for editing a selected shortcut.

As the present invention has been described with preferred embodiment, it will be obviously to those skilled in the art that various modifications may be made. These variations to the described embodiment of the present invention, the scope of which is limited by the following claims.

What is claimed is:

1. A method for programming a telephone shortcut, said method comprising the steps of:

inputting a starting programming control signal;

pressing a key;

storing key information of said pressed key;

storing pressed-time when said key is pressed;

displaying programming status;

repeating said storing key information, said storing pressed-time, and said displaying programming status until an ending programming control signal is inputted; and naming said shortcut.

2. The method according to claim 1, wherein said key information comprises:

a key value for representing alphabet of said pressed key; and a key name for representing operating steps of said shortcut.

3. The method according to claim 1, said method for programming a telephone shortcut further comprising an editing method for editing said shortcut.

4. A method for playing a shortcut, said method comprising the steps of:

inputting a starting playing control signal;

setting a timer;

reading pressed-time of a key;

reading key information of said key;

sending said key information when content of said timer is equal to said pressed-time;

displaying playing status;

repeating said reading pressed-time, reading key information, sending said key information, and displaying said playing status until final key information of said shortcut is sent; and stopping playing said shortcut.

5. The method according to claim 4, said method for playing a shortcut further comprising method for playing pre-selected shortcuts automatically.

6. The method according to claim 5, said method for playing pre-selected shortcuts automatically further comprising method for automatically playing said pre-selected shortcuts each day at a pre-determined time.

7. The method according to claim 5, said method for playing pre-selected shortcuts automatically further comprising method for automatically playing said pre-selected shortcuts once at a pre-determined time.

* * * * *